(12) United States Patent
Cannon et al.

(10) Patent No.: US 7,862,220 B2
(45) Date of Patent: Jan. 4, 2011

(54) INTEGRATION OF LIGHT EMITTING DEVICES AND PRINTED ELECTRONICS INTO VEHICLE TRIM COMPONENTS

(75) Inventors: Carter Scott Cannon, Munich (DE); Oliver Hierl, Unterneukirchen (DE)

(73) Assignee: International Automotive Components Group North America, Inc, Dearborn, MI (US)

( * ) Notice: Subject to any disclaimer, the term of this patent is extended or adjusted under 35 U.S.C. 154(b) by 149 days.

(21) Appl. No.: 12/401,603

(22) Filed: Mar. 10, 2009

(65) Prior Publication Data
US 2010/0232171 A1 Sep. 16, 2010

(51) Int. Cl.
*F21V 7/04* (2006.01)
*F21V 13/00* (2006.01)

(52) U.S. Cl. ............ 362/605; 362/800; 362/812; 40/541

(58) Field of Classification Search ............ 362/511, 362/812, 605, 84, 603, 604; 40/541
See application file for complete search history.

(56) References Cited

U.S. PATENT DOCUMENTS

| | | | |
|---|---|---|---|
| 4,917,927 A | 4/1990 | Sakaitani et al. | |
| 5,514,317 A | 5/1996 | Rosica et al. | |
| 5,780,965 A | 7/1998 | Cass et al. | |
| 5,939,979 A * | 8/1999 | Lee | 340/479 |
| 6,371,548 B1 | 4/2002 | Misaras | |
| 6,483,048 B1 | 11/2002 | Bontrager et al. | |
| 6,497,947 B1 * | 12/2002 | Blais et al. | 428/319.3 |
| 6,623,677 B1 | 9/2003 | Smith et al. | |
| 6,652,128 B2 | 11/2003 | Misaras | |
| 7,014,908 B2 | 3/2006 | Yoneda et al. | |
| 7,078,451 B2 | 7/2006 | Hartman et al. | |
| 7,201,508 B2 | 4/2007 | Misaras | |
| 7,267,791 B2 | 9/2007 | Ricking et al. | |
| 7,384,177 B2 | 6/2008 | Parker | |
| 7,384,178 B2 | 6/2008 | Sumida et al. | |
| 7,401,758 B2 | 7/2008 | Liang et al. | |
| 7,439,672 B2 | 10/2008 | Enz | |
| 7,456,569 B2 | 11/2008 | Wiebmeier et al. | |

(Continued)

FOREIGN PATENT DOCUMENTS

GB 2438440 11/2007

OTHER PUBLICATIONS

MIT Technology Insider, "For Computer Chips, Press 'Print'," available at www.technologyinsider.coml; retrieved on Apr. 14, 2009.

(Continued)

*Primary Examiner*—Sandra L O Shea
*Assistant Examiner*—Danielle Allen
(74) *Attorney, Agent, or Firm*—Grossman, Tucker, Perreault & Pfleger, PLLC

(57) ABSTRACT

A relatively thin printed LED backlight device with an integral diffuser may be integrated into an interior trim component using a molding process, such as injection molding, compression molding and reaction injection molding. The display portion may be placed behind a textile surface or molded grille or may form a portion of the outer surface of the trim component to provide light to low light areas of the vehicle. Electronic circuitry and components may be printed on to the substrate of the device as part of an in-line continuous process at the molding station to allow low inventory and customization of each backlight device.

31 Claims, 9 Drawing Sheets

U.S. PATENT DOCUMENTS

| | | | |
|---|---|---|---|
| 2001/0028131 A1* | 10/2001 | Brodi et al. | 264/255 |
| 2002/0066973 A1* | 6/2002 | Visconti et al. | 264/138 |
| 2005/0206711 A1 | 9/2005 | Milini | |
| 2006/0278853 A1 | 12/2006 | Yang | |
| 2008/0037287 A1 | 2/2008 | Krohn | |
| 2008/0144333 A1 | 6/2008 | Gourlay | |
| 2008/0160243 A1 | 7/2008 | Moosheimer | |
| 2008/0191231 A1 | 8/2008 | Park et al. | |
| 2008/0199687 A1 | 8/2008 | Chiruvolu et al. | |
| 2008/0217950 A1 | 9/2008 | Tiesler et al. | |
| 2008/0253140 A1 | 10/2008 | Fleischmann et al. | |

OTHER PUBLICATIONS

I.T. Strategies, Inkjet Technology as a Manufacturing Process: Much Promise, But a Long Way Off; available at http://www.it-strategies.com/news/59.htm; retrieved on Feb. 27, 2009.

AZo Materials, "Plastic Electronics via Inkjet Printing—Processing, Properties and Applications of Plastic Electronics," available at http://www.azom.com/Details.asp?ArticleID=2128; retrieved on Feb. 27, 2009.

Hakola, "Benefits of inkjet printing for printed electronics," available at www.vtt.fi/liitetiedostot/cluster5_metsa_kemia_ymparisto/PIRA%20Printed%20Electronics%202005%20Hakola.pdf; retrieved on Apr. 16, 2009.

Nelson, "Materials Ink Jet Printing of Electronic Structures," National Nanotechnology Infrastructure Network; 2007 REU Research Accomplishments; pp. 70-71.

Mantysalo, et al., "Inkjet-Deposited Interconnections for Electronic Packaging," NIP23 and Digital Fabrication 2007 Final Program and Proceedings, Society for Imaging Science and Technology; pp. 813-817.

* cited by examiner

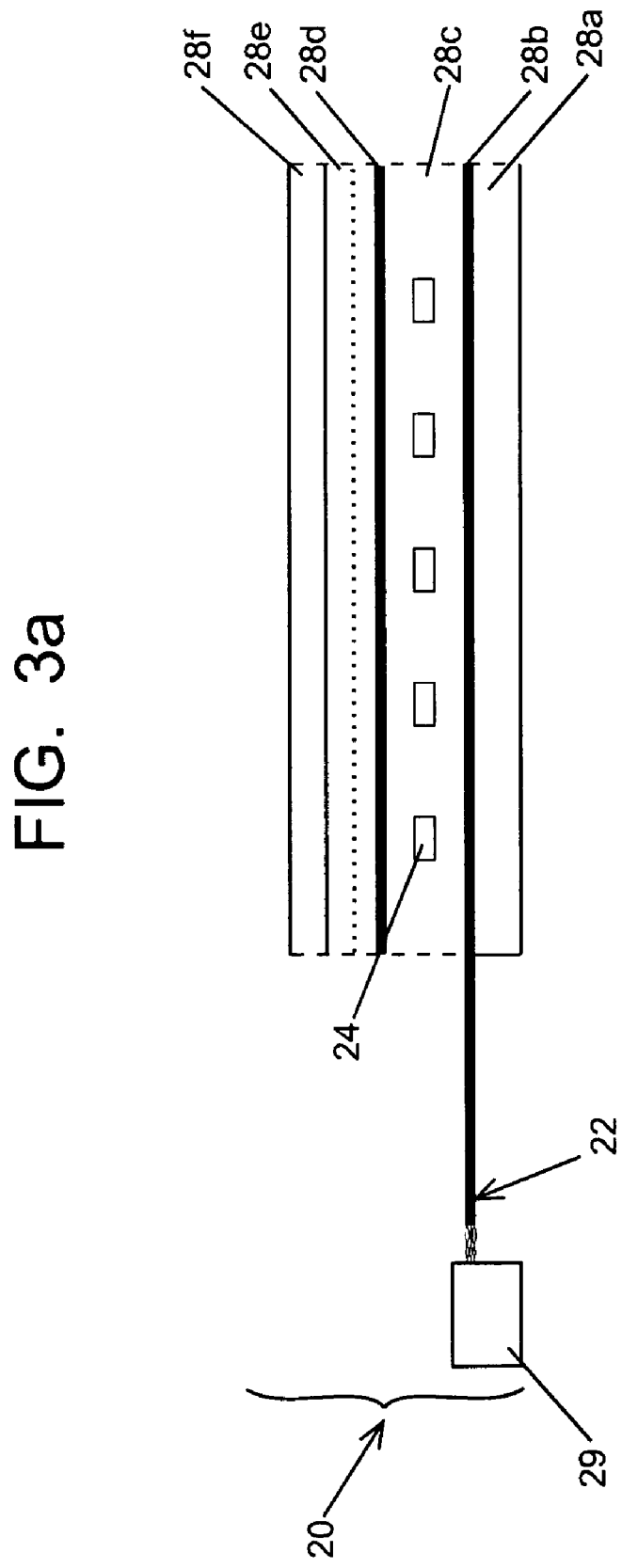

FIG. 6

100 — Provide an inkjet printer directly adjacent a molding press for an interior trim component

200 — Provide a plastic sheet to the printer and advance the sheet through the printer in accordance with a computer program

300 — Deposit droplets of ink according to a computer program onto a surface of the sheet to form electronic circuitry, electronic components and lighting components

400 — Dry the ink droplets and expel the printed sheet from the printer

500 — Trim the sheet to form a backlight device for integration by molding

INTEGRATION OF LIGHT EMITTING DEVICES AND PRINTED ELECTRONICS INTO VEHICLE TRIM COMPONENTS

FIELD

The present disclosure relates to trim components for the interior of transportation vehicles and, more particularly, to the integration of printed electronics and lighting into such components via plastic molding processes.

BACKGROUND

There are a myriad of locations within a motor vehicle or other transportation means where lighting is desired to provide ambient lighting for aesthetics and effect, orientation lighting for safety and convenience and functional lighting for reading, etc. The integration of electronics into lighting devices in the automobile and, more particularly, lighting has become a selling feature and further enhances the ambiance of the interior environment associated with traveling.

A molding method to provide flat panels for backlighting is disclosed in U.S. Pat. No. 4,917,927. A flat sheet of plastic may be printed upon and then insert-molded to form a panel capable of being backlit. Backlighting generally relates to the projection of light on the back of a translucent panel such that images printed upon the panel appear illuminated and brightened.

U.S. Pat. No. 5,514,317 discloses a method for providing three dimensional products which may be at least partially backlit by printing upon a flat substrate, forming the substrate into a shape and injecting molten resin behind the formed substrate.

U.S. Pat. No. 7,401,748 discloses a plastic-based display including in-mold transfer film or foil which may be injection molded behind to form an article having a display panel embedded in its top surface. The display panel may be an organic light emitting device, polymer light emitting device or cholesteric light emitting device.

U.S. Application Publication No. 2008/0253140 discloses a light for motor vehicles comprising a vehicle component including an outer member that transmits light and a light guide and light source including at least one LED (light emitting diode) wherein the light guide and light source are disposed within a watertight cavity.

U.S. Application Publication No. 2008/0144333 discloses a light guide device including a substrate on which are printed a number of light emitting sections coupled to a number of light guides. The printing may employ a negative resist process and a positive mask where the negative resist polymer may be cross-linked by UV light.

Improved molding methods for seamlessly integrating printed electronics and lighting into interior trim componentry are needed to provide thinner panels, to reduce cost and waste and to improve packaging without destroying the electronics and lighting portions during the molding integration process.

SUMMARY

In a first aspect, the present disclosure is directed at a trim component capable of providing light for the interior of a vehicle, the trim component further including a surface, comprising a device having a surface that emits light, wherein the device has a thickness of 0.5 mm to 3.0 mm, including at least two adjacent surfaces, wherein the device surface that emits light comprises a portion of the surface of the trim component. The two adjacent surfaces of the device are partially embedded in molded plastic wherein the molded plastic comprises attachment structure for attaching the trim component in the vehicle. The device includes a light source and electronics printed on a light substrate.

In another aspect, the present disclosure is directed at a method for producing a trim component capable of providing light for the interior of a vehicle, comprising providing a device having a surface that emits light wherein the device has a thickness of 0.5 mm to 3.0 mm, including at least two adjacent surfaces. One may then form the device to shape, wherein the shape complements a surface of a mold for forming the interior trim component. This may then be followed by placing the formed device against the surface in the mold and introducing a flowable plastic behind at least a portion of the device in the mold wherein the two adjacent surfaces of the device are partially embedded in the flowable plastic. The flowable plastic also may form attachment structure for the interior trim component in the vehicle, wherein the device includes a light source and electronics deposited on a light substrate.

In another aspect, the present disclosure is directed at a method for producing a trim component capable of providing light for the interior of a vehicle, comprising providing a device having a surface that emits light wherein the device has a thickness of 0.5 mm to 3.0 mm, including at least two adjacent surfaces. This may then be followed by placing the device in a mold for forming the interior trim component and introducing a flowable plastic behind at least a portion of the formed device in the mold wherein the two adjacent surfaces of the device are partially embedded in the flowable plastic and wherein the flowable plastic forms attachment structure for the interior trim component in the vehicle. The device also includes a light source and electronics deposited on a light substrate.

In a still further embodiment the present disclosure relates to a method for the in-line production of a trim component capable of providing light for the interior of a vehicle, comprising providing an inkjet printer adjacent to a plastic molding press; providing a sheet of plastic to the printer, advancing the sheet through the printer whereby droplets of ink are deposited from one or more printheads in the printer onto a surface of the sheet, the droplets deposited in such a pattern so as to create a printed electronic, optical and/or lighting device, drying the ink droplets, expelling the sheet from the printer, providing a top layer attached to the printed sheet, and trimming the combination of the top layer and sheet to provide a printed electronic, optical and/or lighting device having a thickness of 0.5 to 3.0 mm wherein the device includes two adjacent surfaces. This may the be followed by directly forming the printed electronic, optical and/or lighting device to shape wherein the shape complements a surface of a mold for forming the interior trim component, placing the device against the surface in the mold and introducing a flowable plastic behind at least a portion of the formed device in the mold wherein the two adjacent surfaces of the device are partially embedded in the flowable plastic and wherein the flowable plastic forms attachment structure for the interior trim component in the vehicle, wherein the device includes a light source and electronics deposited on a light substrate.

In a still further embodiment the present disclosure relates to a method for the in-line production of a trim component capable of providing light for the interior of a vehicle, comprising providing an inkjet printer adjacent to a plastic molding press, providing a sheet of plastic to the printer, advancing the sheet through the printer whereby droplets of ink are deposited from one or more printheads in the printer onto a surface of the sheet, the droplets deposited in such a pattern so as to create a printed electronic, optical and/or lighting device, drying the ink droplets, expelling the sheet from the printer and trimming the sheet to provide the printed electronic, optical and/or lighting device having a thickness of 0.5 to 3.0 mm along with two adjacent surfaces. This may then be followed by placing the device in a mold for forming the interior trim component and introducing a flowable plastic behind at least a portion of the device in the mold wherein the two adjacent surfaces of the device are partially embedded in the flowable plastic and wherein the flowable plastic forms attachment structure for the interior trim component in the vehicle, wherein the device includes a light source and electronics deposited on a light substrate.

BRIEF DESCRIPTION OF THE DRAWINGS

The above-mentioned and other features and advantages of this disclosure, and the manner of attaining them, will become more apparent and the disclosure will be better understood by reference to the following description of embodiments taken in conjunction with the accompanying drawings, wherein:

FIG. 3a is an enlarged and exploded schematic representation of the cross-section of the printed backlight 20 of FIG. 2a.

FIG. 4b is a perspective view of FIG. 4a.

FIG. 6 is a process flow diagram illustrating the integration of the forming of a printed device which forms a lighting device directly into the process flow of molding an interior trim component.

DETAILED DESCRIPTION

In a first exemplary embodiment a relatively thin printed LED backlight with an integral diffuser may be integrated into an interior trim component using a molding process, including but not limited to, injection molding, compression molding, reaction injection molding, injection-compression molding, transfer molding and blow molding to provide a relatively thin lighting product that can have optimal integral segmented areas with scalable illumination control, adjustable RGB colors (animation, fading) and capacitive or mechanical switches that requires a relatively low level of power. The display portion may be placed behind a textile surface or molded grille or may form a portion of the outer surface of the trim component to provide light to low light areas of the vehicle, such as foot wells, the interior of glove boxes and consoles and to cargo storage areas.

Figure 1:
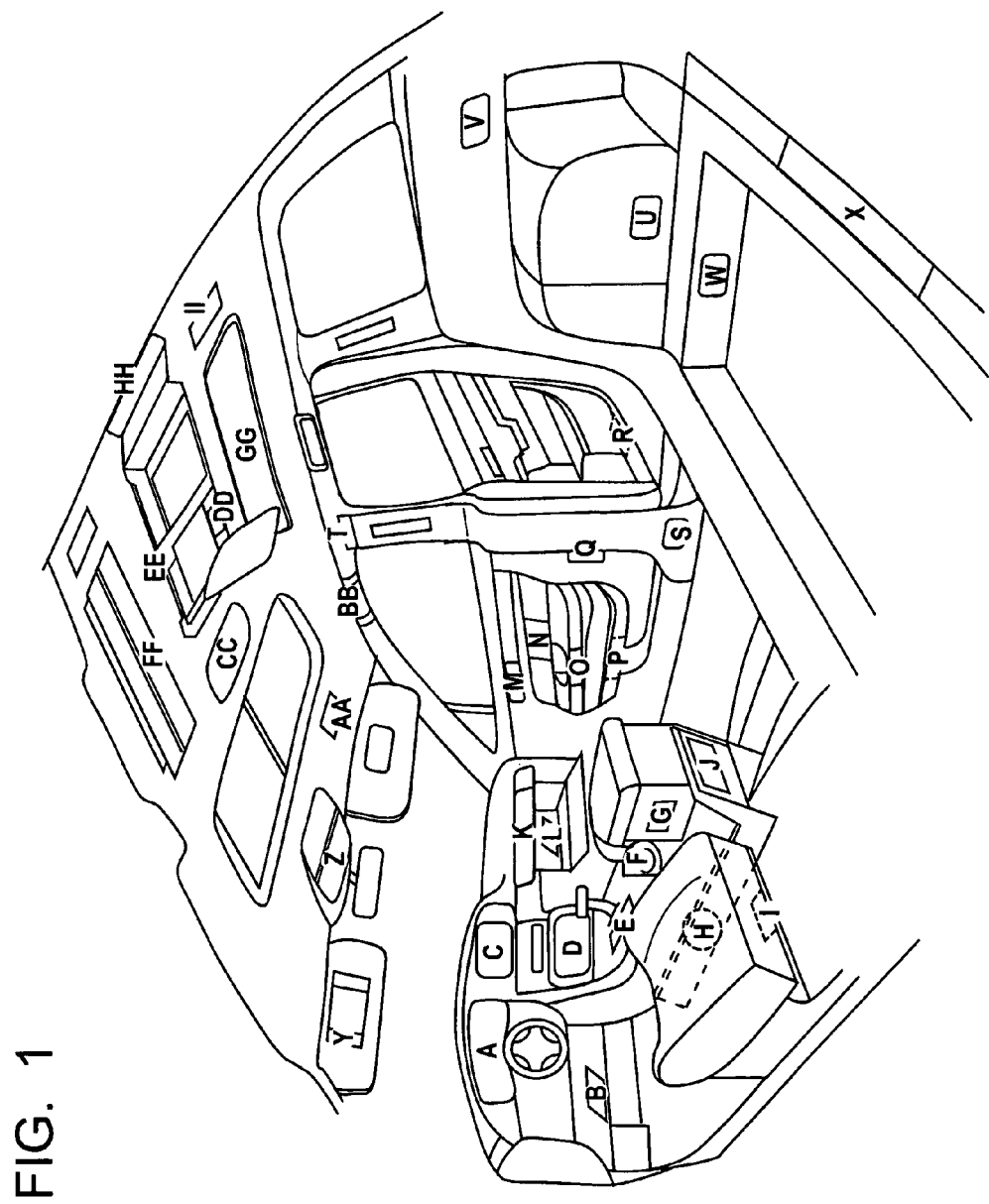
FIG. 1 is a schematic view a portion of the interior of a motor vehicle illustrating some of the many potential applications for lighted interior trim components, according to the present disclosure.

FIG. 1 is a schematic view of the interior of a motor vehicle illustrating some of the many potential applications for lighted interior trim components. Each of the letter designations (A-II) indicate areas of the interior where lighting devices and electronics may be integrated into a trim component to increase the value and versatility of the vehicle. That lighting may further include such features as touch screens, sensors and control functions.

Reference letter A is an example of instrument cluster backlighting. B is an example of footwell lighting for the driver. C is an example of how lighting/controls/touch sensors may be integrated into the infotainment center of a vehicle. D is an example similar to C in the center console area of the vehicle. E illustrates where lighting and electronics may be integrated into the PRNDL—shifter area of a console. F illustrates where lighting and electronics may be integrated into a cupholder area of a center console. G illustrates where lighting and electronics may be integrated into the storage compartment of a center console. H, I and J illustrate additional lighting for foot wells adjacent the center console and for rear passengers under the front seat and rear of the center console, respectively. K represents lighting and electronics integrated into a decorative appliqué on the instrument panel. L illustrates where lighting may be integrated into the glove box.

Turning to door trim, M illustrates how lighting may be used to highlight the interior door handle. N represents a trim insert for the door panel, often covered with textile or a perforated cover material, which may be backlit to provide a level of ambient light to the interior. O represents lighting to a pull cup or grip pull handle area and P represents lighting in a storage pocket. Q represents light at a door edge to indicate to oncoming traffic that the door is open. R represents lighting for puddles and outside hazards when the door is open.

Turning to sidewall and storage areas in the vehicle, S represents lighting integrated into the pillar trim for lighting the foot well area of the second row of seating. T is a similar treatment applied to the top of the pillar post to provide ambient light for assistance in entry/exit. U, V and W are examples of where lighting and electronics may be applied in the cargo storage area for functional lighting and to illuminate the viewing in dark or shadowed areas. X is a sill plate appliqué that may be applied to the sill of any opening to assist in loading/unloading under low lighting conditions and may serve as a decorative backlighting feature (logo, design, etc).

The overhead system of the vehicle represents numerous opportunities for lighting behind molded grilles, etc. Y is a vanity mirror applied to a visor with lighting and sensing capabilities. Z is a console with map reading lighting. AA is a variant for lighting the vanity mirror in the visor and may provide general ambient overhead lighting for the passenger. BB is lighting applied to the headliner to accentuate the grab handle. CC is an example of dome lighting with integral electronics for assisting in entry and general lighting in the vehicle. DD and EE are similar lighting integrated into the overhead console area. FF represents an overhead decorative appliqué with lighting capability. GG represents an overhead lighting panel having a textile outer layer which the lighting may be seen through. HH is a brake light formed according to the present disclosure. II is an overhead panel integrated into the roof portion of the rear storage area.

The present disclosure is directed at the integration of films, foils and display panels having lighting elements and electronics (sensing, controls), systems and assemblies printed thereupon into interior trim components under molding conditions that do not significantly deteriorate or destroy the functionality of such electronics and lighting.

The term "printed electronics" is understood to mean a component or circuitry which may conduct electricity and which is formed by depositing a conductive material onto the surface of a substrate using a printing device or process.

In addition, the present disclosure is directed at the integration of devices, which have a surface that emits light, into interior trim components for a vehicle by molding a flowable plastic around the device, thereby integrating (embedding) the device into the part, where the device is one of a backlight device or a backlight device functioning as a lightguide. The term "backlight" device is understood to mean a device that emits light through the front or the rear surface of the device. The term "lightguide" device is understood to mean a device that emits light through an end or one or more edges of the device.

The term "flowable plastic" is understood to mean a thermoplastic polymer or blend of polymers that through heat and pressure may be made to be distributed and fill out open space in a mold cavity. It is contemplated that "flowable plastic" may also apply to thermosetting polymers which may be provided to a mold in liquid or "pre-preg" form and which may react and polymerize (from precursors) while or after filling out open space in a mold cavity.

Plastic conversion processes such as injection molding, compression molding and blow molding require relatively high temperatures and pressures to plasticate the resin into a flowable melt which fills out a mold. The specific conditions of molding may vary by material type and the complexity of the shape being molded. In order to reduce the potential for damage during processing, the printed lighting device which may include printed patterns of electronics and graphics may be first formed to shape (preformed) such that the surface of the device basically conforms to a surface of the mold in which it will be integrated into an interior trim component. Accordingly, a flowable plastic provided to the mold need only to flow at least partially around the edges and back surface of the printed device and minimize the pressure required during injection. Generally, this liquid flow may force the outer surface of the printed substrate against a surface of the mold and allow the display surface of the device to reside at an outer surface of the interior trim component such that light may be emitted from that surface (front surface in the case of a backlight, edge in the case of a lightguide).

Figure 2C:
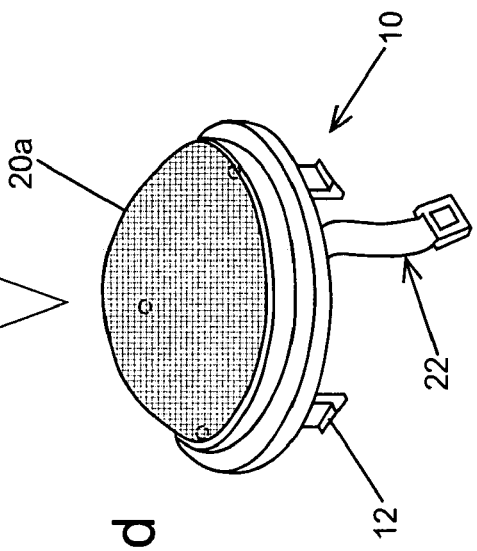
FIGS. 2a-d illustrates the forming and integration process for providing a lighted interior trim component (dome lamp) according to the present disclosure.
Figure 2D:
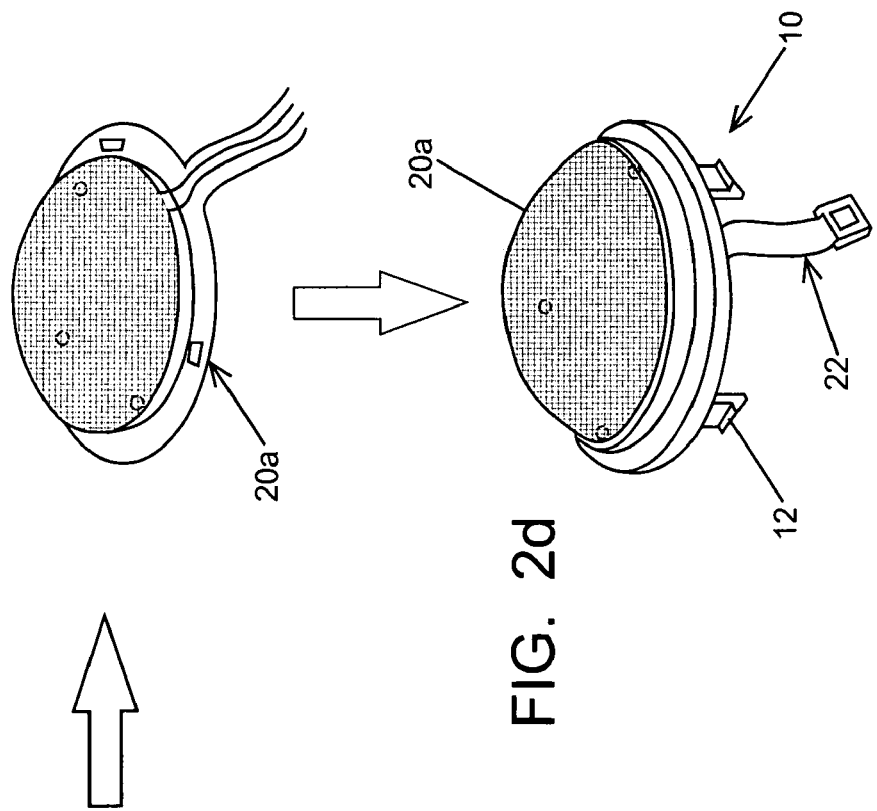
Figure 2B:
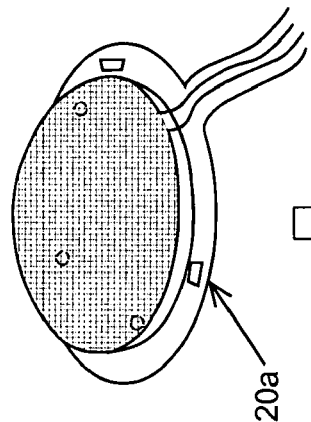

The integration process is seen in schematic form in FIGS. 2a-d where 10 represents the interior trim component such as an appliqué, trim insert, trim panel, bezel or dome light and 20 represents the printed panel which emits the light. The display panel may be a backlight device or a backlight device including a lightguide. For instance, a printed backlight device 20 including LED's 24 may be provided as a flat substrate (FIG. 2a) having a pigtail or wiring harness 22 to connect to a power source. The backlight 20 may be formed to shape in a compression mold 30 or under vacuum (FIG. 2b) to the final shape which may complement the outer surface of the interior trim component 10. The formed printed device 20a may then be removed from the forming mold and transferred to a mold (not shown) for integrating into an interior trim component 10. The integration may take place by molding a flowable plastic behind and at least partially around the formed printed device 20a such that the device 20a becomes at least partially embedded in the plastic (FIG. 2d). The plastic may form a relatively rigid backing, or in this case a bezel, for the formed printed device, allowing for attachment structure 12 as well as providing protection from damage during use. Slots/holes 26 may be provided in the border or light barrier 21 of the device 20 (FIG. 2a) to provide anchoring of the substrate in the molded plastic forming the lighting component 10. Such a component is shown as the dome light, reference numeral CC in FIG. 1, for instance. The border 21 acts as a light barrier to prevent light from leaking from the edge of the device.

The phrase "partially embedded" is understood to mean that the flowable plastic may at least partially cover at least two adjacent surfaces of the printed light emitting device.

Figure 7:
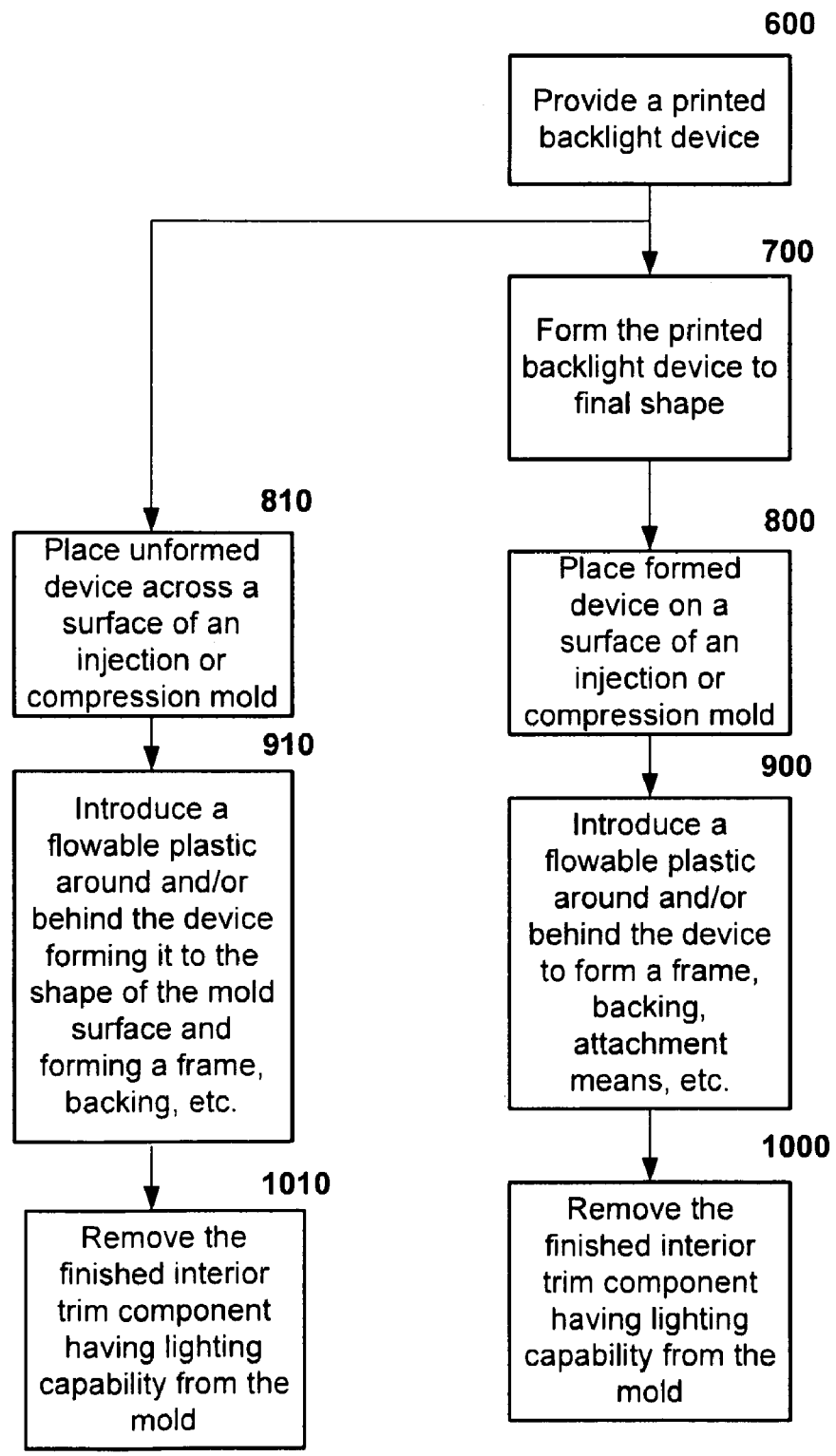
FIG. 7 is a process flow diagram illustrating the integration of the device of FIG. 3a into the process of molding an interior trim component.

FIG. 7 is a process flow diagram illustrating the integration steps described above. A printed backlight device, optionally including a lightguide, may be provided at 600. At 700 the device is formed to final shape. At 800 the formed device is placed on a surface of an injection mold or compression mold for an interior trim component. At 900 a flowable plastic (thermoplastic or thermosetting) may be introduced into the mold, behind and at least partially around the device to form a backing, frame, attachment means, etc. Finally, at 1000 a finished interior trim component having lighting capability and integrated printed electronics may be removed from the mold. Optionally, the printed backlight or other light emitting device may be placed directly into the injection or compression mold at 810 and the flowable plastic introduced at 910 such that the pressure of the molding process forms the device to conform to a surface of the interior trim component mold. At 1010 a finished interior trim component having lighting capability and integrated printed electronics may be removed from the mold.

Forming of the printed light emitting device 20 may include vacuum forming or compression forming of the device to a curvature having a radius of greater than 50 mm in the area of the printed electronics and a radius of greater than 6 mm in the area that emits light. Such forming may include heating of the printed light emitting device and/or the forming mold 30 prior to forming.

Injection molding of the formed printed substrate 20a may include providing resin to a closed mold containing the light emitting device where the process is operated under relatively low pressure. Low pressure molding processes are preferred herein as they typically result in less damage and disruption to the device during the molding process. Low pressure processes that are suitable for this invention generally may use polymers of two types, thermoset and thermoplastic. The thermoset low pressure molding processes may be a liquid processes, often called reaction injection molding (RIM) where a reactive polymer or its precursors may be injected into a closed mold and flow to fill the open space between mold halves before solidifying. Optionally, a charge of a pre-compounded resin may be provided to an open mold and caused to flow under heat and pressure. The types of polymers may include, but are not limited to, urethane, polyester, dicyclopentadiene, polyurea, epoxy and phenolic, and may include fillers and reinforcements. Other suitable thermoset processes include transfer molding and injection-compression molding.

Low pressure thermoplastic injection molding generally entails lower clamp pressure (for instance, at or below 2000 psi) than regular injection molding processes due to one or more of the following characteristics: filling the mold while it is partially open, use of cascading sequential gating to distribute the flow, pre-expanding the melt, introducing a gas to fill out a short shot, low speed injection of the polymer, elimination of pack out and hold pressure, use of easy flow, relatively low melt viscosity polymers, and the use of relatively high melt index polymers (e.g. melt index values greater than 5, more preferably melt flow values in the range of 5-50, including all values therein, in 1.0 increments). Polymers which may be used to form the interior trim component according to the present disclosure may include polyethylene (PE), polypropylene (PP), acrylonitrile-butadiene-styrene (ABS), poly(vinyl chloride) (PVC), polyolefins, polycarbonate (PC) and blends thereof.

Low pressure compression molding of the formed printed substrate may take place by placing a heated charge of a polymer into a mold cavity and closing the mold to melt the charge and allow the polymer to flow to fill out the cavity space and at least partially flow around a device to be embedded. This process entails the molding of the polymer under clamp pressures of less than or equal to about 1000 psi. Polymers which may be used to form the interior trim component according to the present disclosure may include polyethylene (PE), polypropylene (PP), acrylonitrile-butadiene-styrene (ABS), poly(vinyl chloride) (PVC), polyolefins and polyurethane (TPU). These resins may be glass-filled or be in the form of a sheet or lamination of sheets, including resin/natural fiber webs, that are preformed, precut to shape and/or pre-weighed to minimize the pressure required to distribute the resin to fill out the mold cavity space. As noted above, one may utilize such polymer with melt flow values of 5-50.

Figure 2A:
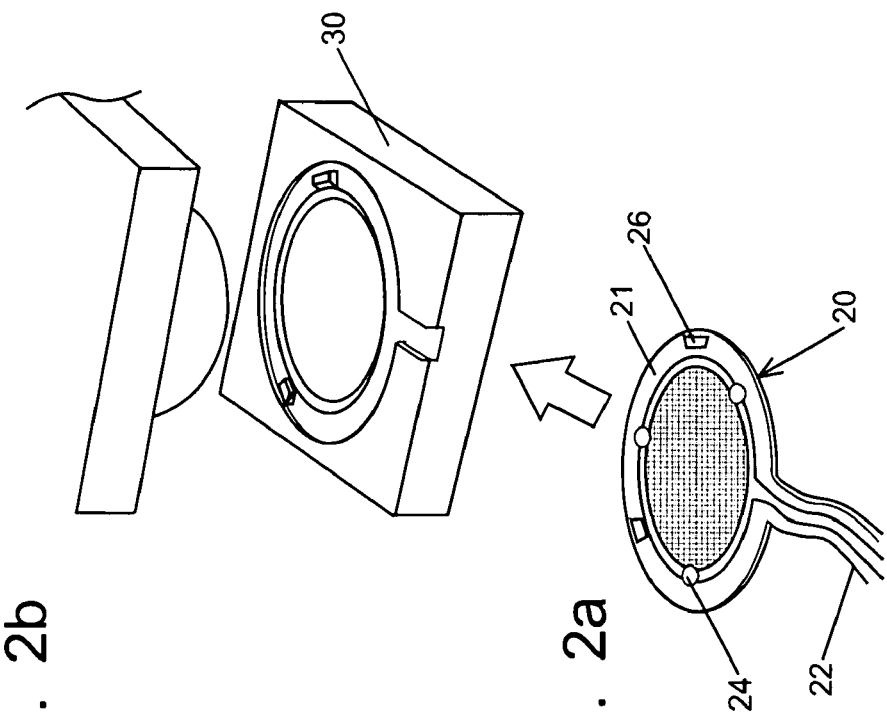

FIG. 3a is an enlarged and exploded schematic representation of the cross-section of the backlight device 20 of FIG. 2a illustrating various elements/components that may be present to provide functionality. The overall thickness may be in the range of 0.5-2.0 mm, including all values therein, in 0.1 mm increments. A relatively flexible and light transmissive substrate layer 28a, comprising a plastic such as a polycarbonate, polyimide, acrylic, acetate, polyester, PVC, polyethylene terephthalate or polyethylene naphthalate sheet, may have printed thereon a variety of functional components. The sheet 28a may itself typically be about 0.2-0.5 mm in thickness. In one exemplary embodiment, the printing may be accomplished using an inkjet printer, as described below, or screen printing process. For instance, electrical circuitry 28b may be printed on to the surface of the substrate layer 28a to transfer electricity from a connector 29 via a wiring harness or pigtail 22 to various functional electrical components which may also be printed, deposited or attached in a pattern on the substrate layer 28a. Some of these components may include resistors, transistors, capacitors, switches, inductors and sensors. In addition, LED's 24 (light emitting devices) may be deposited on the substrate layer 28a at various locations to act as a light source. These LED's may provide full RGB (red-green-blue) color capability. The LED's 24 may be stand-alone components to provide backlighting (light emitting from the front or rear surface of the printed device) or may be optically coupled with one or more segmented light guides 28d which may overlie the printed substrate layer 28a to provide light emitting from an edge of the printed device. The outer layer 28f may comprise a light transmissive layer, comprising, for instance a polycarbonate, polystyrene or polyethylene sheet which may be decorated with printed graphics, or be a coating which may function as a protective layer. Between the light guide 28d and the outer layer including graphics 28f may be a diffuser or mask 28e to control the lighting pattern and to control which portions of the top layer 28f are backlit. The diffuser layer may also be a printed layer of ink (or laser etched). The light guide layer 28d may be an optical polymer, such as an acrylate, and be applied by printing, stamping, embossing, etc.

Figure 3B:
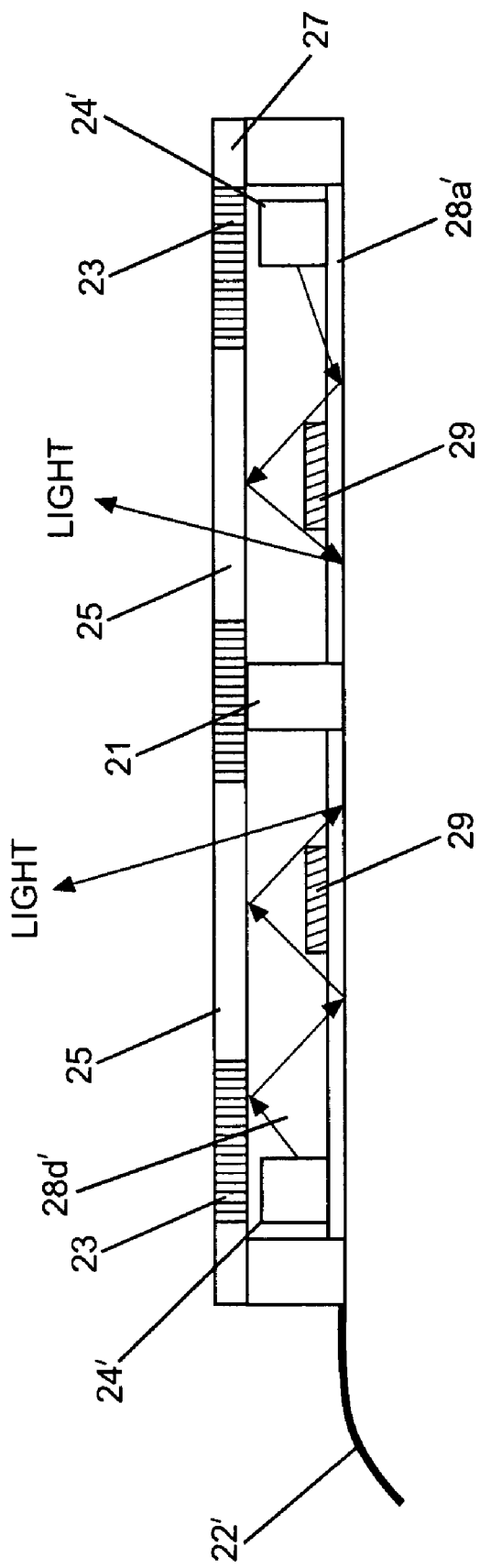
FIG. 3b is an enlarged and exploded schematic representation of the cross-section of a printed backlight with integral printed switches which may provide control functions.

FIG. 3b is a cross-sectional view of a printed light with integral switch device including capacitive sensing pads and LED's that may be embedded in the lightguide portion to provide control functions. The assembly 20' may include a light transmissive relatively flexible substrate layer 28a' and a lightguide layer 28d' into which LED's 24' and capacitive sensing pads 29 have been deposited. The lightguide layer 28d' may also include light barriers 21 to segment and direct the light. A top layer 27 may have printed on the top surface a series of graphics 23 and/or icons 25 which may direct the light from the LED's out of the assembly and highlight the icons or backlight the graphics. Also shown is a wiring harness 22' for connecting to electrical power. The device including the integrated switch may be insert-molded or back-molded as part of the substrate layer for an interior trim component wherein the graphics and icons become the top (show) surface of the component and the icons may be pressed to activate the underlying capacitive sensing pads. Again, the overall thickness of the embodiment illustrated in FIG. 3b may be 0.5 mm to 3.0 mm.

By insert-molding or back-molding, it is understood to mean that the backlighting device or switch device as described above may be placed against one surface of a mold and a flowable plastic injected or otherwise provided adjacent the backside and edges of the device to at least partially embed the device in a molded shape which will become an interior trim component. The flowable plastic which embeds the device is introduced under conditions which do not damage the backlighting device or lightguide so that it may function as desired when utilized as a trim component.

Figure 4A:
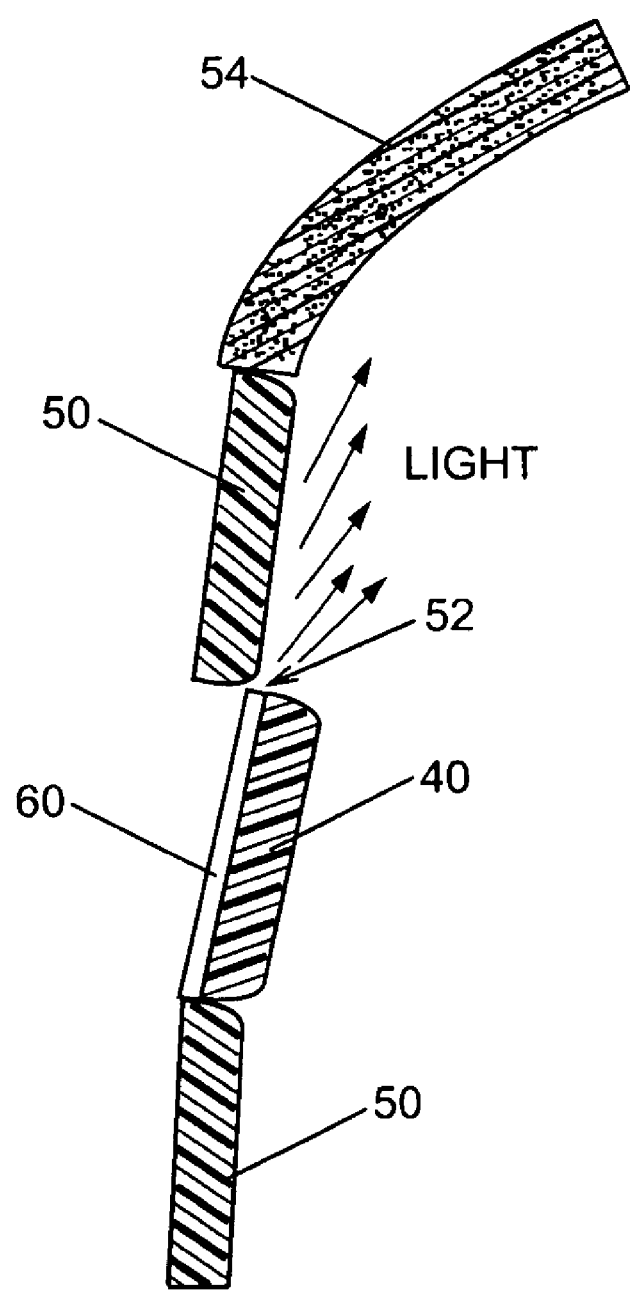
FIG. 4a is a cross-sectional view of a printed backlight integrated into a B-pillar of an automobile, according to the present disclosure.
Figure 4B:
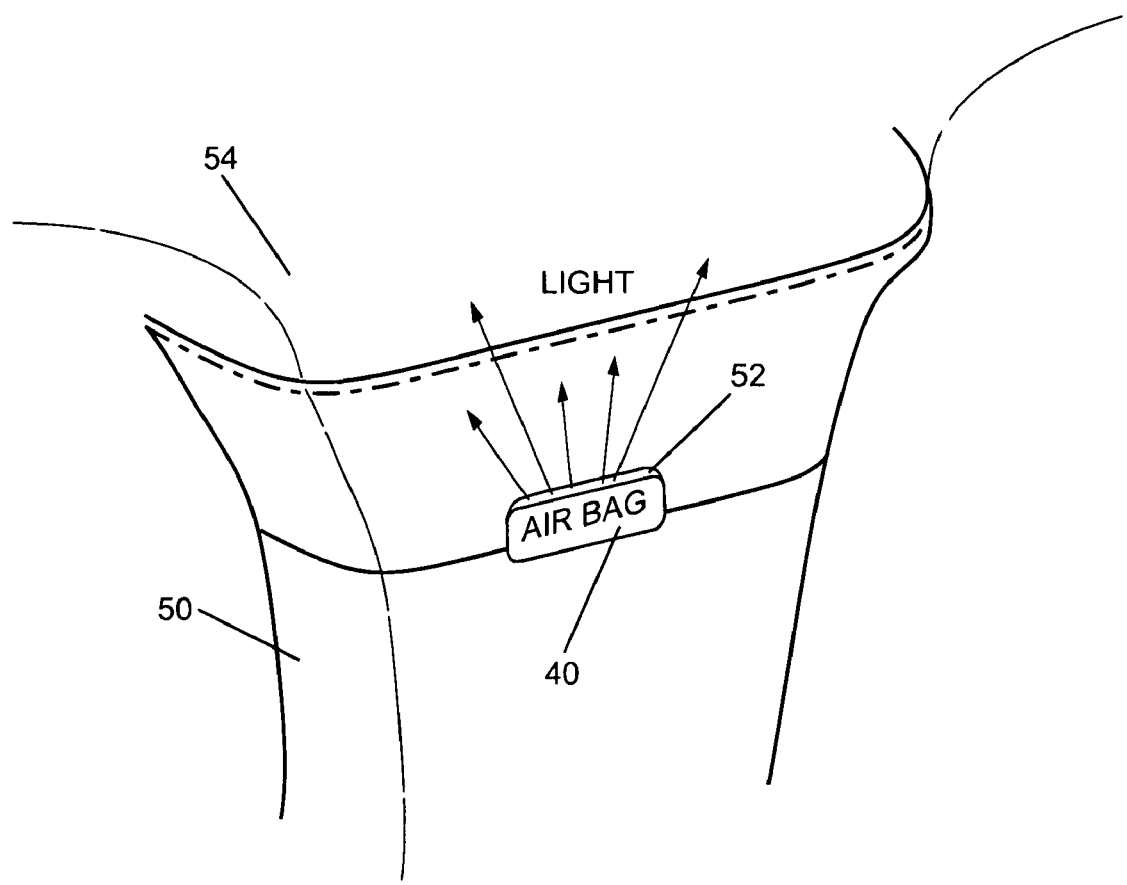

FIGS. 4a and 4b illustrate an example of a backlight device integrated into a B-pillar of an automobile where the lightguide and electronics are molded or attached onto the backside of an emblem identifying the location of a side airbag (AIRBAG) and the lightguide projects light upward and through an opening having a 1-2 mm designed gap in the trim panel (see, for instance, reference numeral T in FIG. 1). Shown in cross-section in FIG. 4a, the airbag emblem 40 is located on the B-pillar as part of the trim which may comprise a molded plastic panel 50 which may cover a side impact system (not shown). Molded onto the back of the emblem 40 is a backlight device 60 which may project light shown by the arrows towards the top of the pillar post and headliner 54, through the opening 52 to provide ambient lighting as well as lighting for entry/exit of the vehicle. FIG. 4b is a perspective view of FIG. 4a showing the light projecting thru the opening 52 behind the emblem and onto the surface of the headliner 54. Optionally, there may be a larger opening having a transparent cover, grille or layer of textile.

Printed backlight device 60 may comprise a construction as described in FIG. 3a but in which layers 28a and 28f are opaque such that light is emitted along an edge or end of the printed device. In that fashion, the backlight acts as a lightguide. Optionally, the surfaces of layers 28a and 28f may be covered with a reflective coating.

Figure 5:
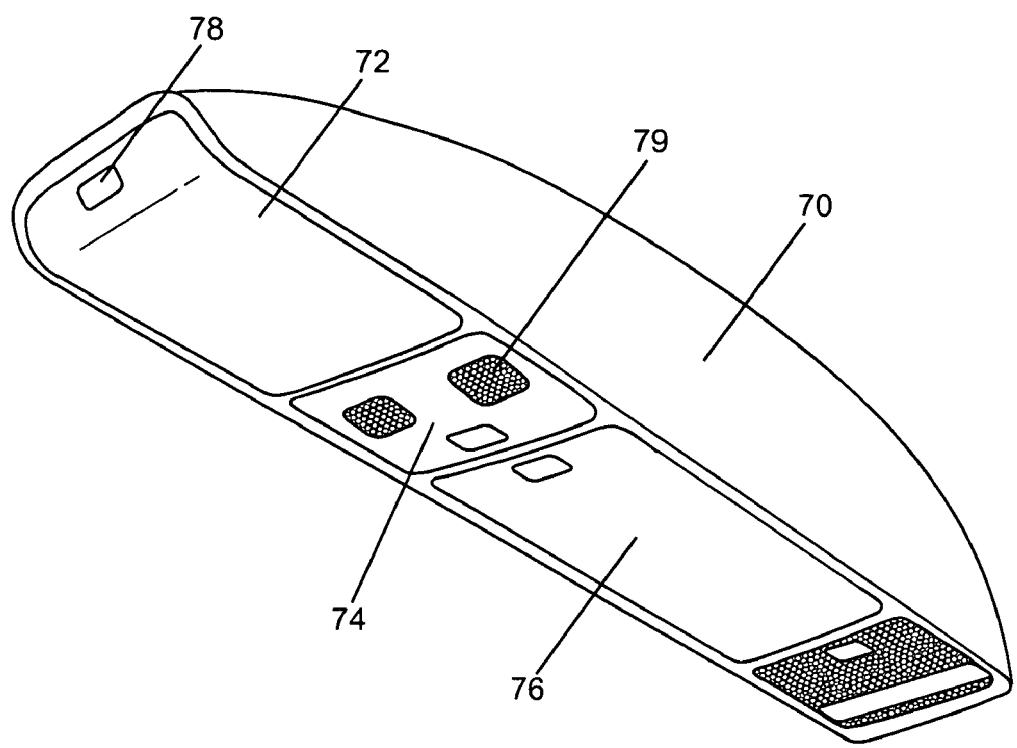
FIG. 5 is a perspective view of an overhead center console in the headliner of a vehicle, including a storage compartment having a grille area backlit according to the present disclosure.

FIG. 5 is a perspective view of an overhead center console in the headliner of a vehicle. (See reference letter EE in FIG. 1). The overhead console 70 may include a series of storage bins or compartments having hinged lids 72, 74, 76 for the storage of relatively lightweight articles such as sunglasses, garage door openers, keys, etc. The lids may have a push button 78 for release and may include grilles 79 comprising a plurality of openings in a pattern to allow light to be directed into a specific area of the passenger cabin. Behind the grilles 79 there may be a printed backlight device (not shown), as described above and shown in enlarged and exploded view in FIG. 3a, which has been molded into the compartment lid 74.

In another exemplary embodiment, the present disclosure is directed at the direct inkjet printing of such electronics and lighting elements as printed circuitry, micro-lenses, light guides, LED's (light emitting diodes), LCD's (light crystal displays) on to a substrate to form a backlight or lightguide device which will be integrated directly into an interior trim component as part of a continuous in-line process flow. This may provide additional efficiencies in material and labor costs, and allow for an in-line and continuous processing wherein different product options or designs may be readily customized without having to build a significant inventory.

This in-line process may be accomplished using inkjet printing of a computer generated image (electrical circuit schematics, lightguide, light diffuser, etc.) and printing such an image directly onto a substrate (or molded trim component) that will form a portion of the interior trim component. Electronic components that may be printed may include capacitors, inductors, resistors and transistors. In addition, LED's may be deposited on the substrate and coupled to a circuit and used as stand-alone sources of lighting or may be optically coupled to lightguides to project light to surfaces and edges of the substrate.

Direct inkjet printing may be accomplished directly adjacent a plastic molding press (injection, compression) to feed backlight or lightguide devices as described above on a one-for-one basis to the molding press for integration into an interior trim component thus reducing inventory, floor space, emissions, cost, etc. In other words, the direct printing process may be integrated directly into the production line flow for manufacturing interior trim components. That is, the timing for the production of the backlighting or lightguide devices is regulated to match the timing for the production of a given trim panel.

As described in FIG. 6 at 100, an inkjet printer may be located directly adjacent a molding press for an interior trim component. At 200, the inkjet printer may receive sheets of a light transmissive plastic, such as polycarbonate, polyimide, acrylic, acetate, polyester, PVC, polyethylene terephthalate and polyethylene naphthalate which may optionally have the top surface pretreated to provide compatibility with the inks to be used. The sheets may be advanced through the printer and droplets of ink deposited 300 by printheads in a controlled pattern to create electronic circuitry and electronic components, in some cases in layered configuration. The inks may comprise, for instance, microcapsules filled with pigment particles, nanoparticles comprising silver or gold, carbon nanotubes, conductive polymers such as polyaniline and poly(3,4-ethylene dioxitiophene) doped with polystyrene sulfonate, metal particle inks comprising copper, and semi-conducting materials such as polythiopene.

LED's, lightguides, switches and sensors may be similarly formed by or deposited during inkjet printing.

Once the ink has been deposited it may be dried 400 (by the application of heat or by the polymerization of the ink, or by using a heated substrate fed to the printer) and the sheet trimmed 500 to provide a printed backlight device which may be integrated into an interior trim component for a vehicle. As described in FIG. 7, the device may then be formed to shape, if necessary, and placed in a mold for forming an interior trim component. A flowable plastic may be introduced to the mold such that the plastic at least partially embeds the device into the trim component and the surface of the device that emits light comprises a portion of a surface of the trim component (see FIG. 2d and FIG. 4a). As noted in FIG. 7 and above, optionally, the forming to shape of the printed device may occur during the molding of the interior trim component due to the pressure generated during the plastic molding process.

While the present disclosure is mainly directed at uses of the present invention for lighting in the interior of a transportation vehicle, it is contemplated that the features may be similarly applied on the exterior of the vehicle as well.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A trim component capable of providing light for the interior of a vehicle, said trim component further including a surface, comprising:
    a device having a surface that emits light, wherein said device has a thickness of 0.5 mm to 3.0 mm, including at least two adjacent surfaces, wherein said device surface that emits light comprises a portion of said surface of said trim component;
    said two adjacent surfaces of said device being partially embedded in molded plastic;
    wherein said molded plastic comprises attachment structure for attaching said trim component in said vehicle;
    wherein said device includes a light source and electronics printed on a light substrate.

2. The trim component of claim 1 wherein said device is one of a backlight device or a lightguide device.

3. The trim component of claim 2 wherein said backlight device includes a light source and electronics printed on a light transmissive substrate.

4. The trim component of claim 3 wherein said light source is an LED.

5. The trim component of claim 2 wherein said lightguide is optically coupled to a light source and further includes electronics printed on a light transmissive substrate.

6. The trim component of claim 1 wherein said surface of said device is covered by one of a molded plastic grille, a layer of textile, a transparent decorative part, a layer of foam-backed textile or a perforated material including a pattern of holes.

7. The trim component of claim 2 wherein said lightguide device comprises a light transmissive layer positioned between two outer opaque layers.

8. The trim component of claim 5 wherein said printed electronics include at least one of circuitry, a resistor, an inductor, a capacitor, a transistor, a switch or a sensor.

9. A method for producing a trim component capable of providing light for the interior of a vehicle, comprising:
    providing a device having a surface that emits light wherein said device has a thickness of 0.5 mm to 3.0 mm, including at least two adjacent surfaces;
    forming said device to shape, wherein said shape complements a surface of a mold for forming said interior trim component;
    placing said formed device against said surface in said mold; and
    introducing a flowable plastic behind at least a portion of said device in said mold wherein said two adjacent surfaces of said device are partially embedded in said flowable plastic and wherein said flowable plastic forms attachment structure for said interior trim component in said vehicle, wherein said device includes a light source and electronics deposited on a light substrate.

10. The method of claim 9 wherein said device is one of a backlight device or a lightguide device.

11. The method of claim 10 wherein said backlight device includes a light source and electronics printed on a light transmissive substrate.

12. The method of claim 11 wherein said light source is an LED.

13. The method of claim 10 wherein said lightguide device is optically coupled to a light source and further includes electronics printed on a light transmissive substrate.

14. The method of claim 13 wherein said electronics include at least one of circuitry, a resistor, an inductor, a capacitor, a transistor, a switch or a sensor and are deposited by printing.

15. The method of claim 10 wherein said lightguide device comprises a light transmissive layer positioned between two outer opaque layers.

16. The method of claim 9 wherein said introducing a flowable plastic comprises one of low pressure injection molding, injection-compression molding or reaction injection molding including a clamp pressure, wherein said clamp pressure is less than about 2000 psi.

17. The method of claim 9 wherein said introducing a flowable plastic comprises compression molding or transfer molding including a clamp pressure, wherein said clamp pressure is less than about 1000 psi.

18. A method for producing a trim component capable of providing light for the interior of a vehicle, comprising:
providing a device having a surface that emits light wherein said device has a thickness of 0.5 mm to 3.0 mm, including at least two adjacent surfaces;
placing said device in a mold for forming said interior trim component; and
introducing a flowable plastic behind at least a portion of said formed device in said mold wherein said two adjacent surfaces of said device are partially embedded in said flowable plastic and wherein said flowable plastic forms attachment structure for said interior trim component in said vehicle, wherein said device includes a light source and electronics deposited on a light substrate.

19. The method of claim 18 wherein said device is one of a backlight device or a lightguide device.

20. A method for the in-line production of a trim component capable of providing light for the interior of a vehicle, comprising:
providing an inkjet printer adjacent to a plastic molding press;
providing a sheet of plastic to said printer;
advancing said sheet through said printer whereby droplets of ink are deposited from one or more printheads in said printer onto a surface of said sheet, said droplets deposited in such a pattern so as to create a printed electronic, optical and/or lighting device;
drying said ink droplets;
expelling said sheet from said printer,
providing a top layer attached to said printed sheet;
trimming said combination of top layer and sheet to provide said printed electronic, optical and/or lighting device having a thickness of 0.5 to 3.0 mm wherein said device includes two adjacent surfaces;
directly forming said printed electronic, optical and/or lighting device to shape wherein said shape complements a surface of a mold for forming said interior trim component;
placing said device against said surface in said mold; and
introducing a flowable plastic behind at least a portion of said formed device in said mold wherein said two adjacent surfaces of said device are partially embedded in said flowable plastic and wherein said flowable plastic forms attachment structure for said interior trim component in said vehicle, wherein said device includes a light source and electronics deposited on a light substrate.

21. The method of claim 20 wherein said device is one of a backlight device or a lightguide device.

22. The method of claim 21 wherein said lightguide device comprises a light transmissive layer positioned between two outer opaque layers.

23. The method of claim 20 wherein said sheet of plastic comprises polycarbonate, polyimide, polyethylene terephthalate or polyethylene naphthalate.

24. The method of claim 20 wherein said forming to shape of said device comprises vacuum forming or compression forming.

25. The method of claim 20 wherein said in-line production comprises a one-for-one manufacture of said printed electronic, optical and/or lighting device through said printer, forming of said device to shape and molding said device into an interior trim component.

26. The method of claim 20 wherein said light source is an LED.

27. The method of claim 20 wherein said electronics includes at least one of circuitry, a resistor, an inductor, a capacitor, a transistor, a switch or a sensor printed on said substrate.

28. The method of claim 20 wherein said introducing a flowable plastic comprises one of low pressure injection molding, injection-compression molding or reaction injection molding including a clamp pressure, wherein said clamp pressure is less than about 2000 psi.

29. The method of claim 20 wherein said introducing a flowable plastic comprises one of compression molding or transfer molding including a clamp pressure, wherein said clamp pressure is less than about 1000 psi.

30. A method for the in-line production of a trim component capable of providing light for the interior of a vehicle, comprising:
providing an inkjet printer adjacent to a plastic molding press;
providing a sheet of plastic to said printer;
advancing said sheet through said printer whereby droplets of ink are deposited from one or more printheads in said printer onto a surface of said sheet, said droplets deposited in such a pattern so as to create a printed electronic, optical and/or lighting device;
drying said ink droplets;
expelling said sheet from said printer,
trimming said sheet to provide said printed electronic, optical and/or lighting device having a thickness of 0.5 to 3.0 mm along with two adjacent surfaces;
placing said device in a mold for forming said interior trim component; and
introducing a flowable plastic behind at least a portion of said device in said mold wherein said two adjacent surfaces of said device are partially embedded in said flowable plastic and wherein said flowable plastic forms attachment structure for said interior trim component in said vehicle, wherein said device includes a light source and electronics deposited on a light substrate.

31. The method of claim 30 wherein said device is one of a backlight device or a lightguide device.

* * * * *